UNITED STATES PATENT OFFICE.

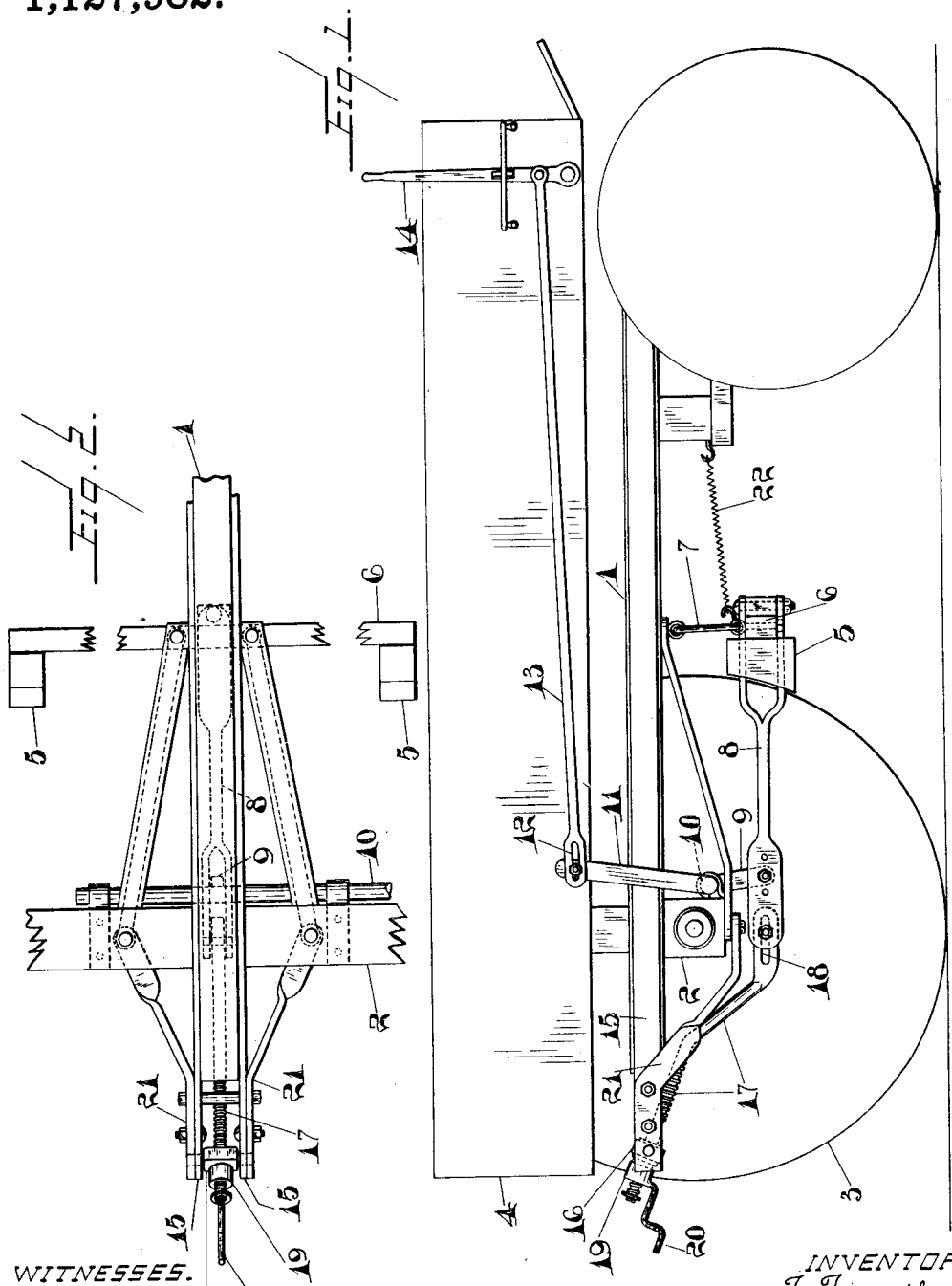

THOMAS FINDLEY AND OTTO G. RIESKE, OF TORONTO, ONTARIO, CANADA, ASSIGNORS TO MASSEY-HARRIS COMPANY, LIMITED, OF TORONTO, ONTARIO, CANADA.

WAGON-BRAKE.

1,127,982.   Specification of Letters Patent.   Patented Feb. 9, 1915.

Application filed October 13, 1914. Serial No. 866,478.

*To all whom it may concern:*

Be it known that we, THOMAS FINDLEY and OTTO G. RIESKE, both of the city of Toronto, in the county of York, Province of Ontario, Canada, have invented certain new and useful Improvements in Wagon-Brakes, of which the following is a specification.

This invention relates to brakes particularly adapted for vehicles intended for heavy service, such as army wagons and artillery, and our object is to devise an effective brake, operable both from the front and rear of the wagon, which will be as simple as possible and possess great strength and freedom from liability to accidental injury or disarrangement.

We attain our object by means of the constructions hereinafter described and illustrated in the accompanying drawings in which—

Figure 1 is a side elevation of parts of a wagon provided with our improved brake; and Fig. 2 a plan view of the same.

In the drawings like numerals of reference indicate corresponding parts in the different figures.

1 is the reach of the wagon, 2 the rear axle, 3 the rear wheels and 4 the box. The brake shoes 5 are secured to the ends of the brake beam 6, which, by means of the links 7, is suspended from the reach. A connecting rod 8 is connected with the brake beam and also pivotally connected with the crank arm 9 secured to the rock shaft 10 suitably journaled on the forward side of the axle 2. The shaft is provided with the rock arm 11. The rock arm, by means of a bolt and slot connection 12, is connected with the rear end of the connecting rod 13, which is connected with the hand lever 14 on the forward end of the box, by means of which it may be operated to rock the shaft 10 and thus apply the brakes. The bolt and slot connection enables the brakes to be applied by means of a mechanism we will now describe, as the rock arm may thus move independently of the connecting rod.

A bracket is formed at the rear end of the reach by projecting the ends of the metal plates 15 applied to the sides of the reach. Between the ends of the plates 15 is pivoted the bar 16. Through this bar passes freely the brake applying screw 17. The forward end of this screw is bent downwardly and then forwardly, and by means of a slot and bolt connection 18 is connected to the rearward end of the connecting rod 8. On the end of the screw, behind the bar 16, a nut 19 is screwed. This nut is provided with the crank handle 20, by means of which it may be rotated to draw on the screw 17 to apply the brakes. The slot and bolt connection prevents the screw from interfering with the application of the brakes by means of the hand lever 14.

The ends of the plates 15 forming the brackets supporting the bar 16 are braced from the axle by means of the downwardly and laterally extending braces 21 suitably secured to the plates 15 and the under side of the axle. It will be seen that the screw thus obtains its support directly on the end of the reach, which support is formed by the plates 15 without the necessity for employing any depending lugs or brackets. The crank handle 20, by this arrangement is also presented in a convenient position for use.

A coil spring 22 is secured to the brake beam and any convenient stationary part of the wagon and tends to hold the brakes in the "off" position.

From the above description it will be seen that we have devised a brake which satisfactorily attains the object of our invention set out in the preamble to this specification.

What we claim as our invention is:—

1. The combination of a wagon, its reach, rear axle and wheels; a suitably hung brake beam and brake shoes adapted to engage the wheels; a connecting rod below the axle connected to the brake beam; a bracket at the rear end of the reach; a bar journaled therein having a hole therein; a brake applying screw connected with the connecting rod and extending through the hole in said bar; and a nut threaded on said screw engaging the rear side of the bar.

2. The combination of a wagon, its reach, rear axle and wheels; a suitably hung brake beam and brake shoes adapted to engage the wheels; a connecting rod below the axle connected to the brake beam; a bracket at the rear end of the reach; braces extending downwardly and laterally from said bracket to the underside of the axle; a bar journaled therein having a hole therein; a brake applying screw connected with the connecting rod and extending through the hole in said bar; and a nut threaded on said screw engaging the rear side of the bar.

3. The combination of a wagon, its reach, rear axle and wheels; a suitably hung brake beam and brake shoes adapted to engage the wheels; a connecting rod below the axle connected to the brake beam; a crank shaft journaled on the axle; a crank arm on said shaft, pivotally connected to the connecting rod; a rock arm on said shaft; a connecting rod for operating the brake having a bolt and slot connection with the rock arm; a bracket at the rear end of the reach; a bar journaled therein having a hole therein; a brake applying screw connected with the connecting rod by a bolt and slot connection and extending through the hole in said bar; and a nut threaded on said screw engaging the rear side of the bar.

4. The combination of a wagon, its reach, an axle and wheels; a brake system; a rearwardly extending screw for operating said system; plates on the sides of the reach forming a bracket rearwardly extending from the reach; a bar journaled in said plates having a hole therein through which the said screw passes freely; and a nut on said screw engaging the rear side of the bar.

5. The combination of a wagon, its reach, an axle and wheels; a brake system; a rearwardly extending screw for operating said system; plates on the sides of the reach forming a bracket rearwardly extending from the reach; a bar journaled in said plates having a hole therein through which the said screw passes freely; a nut on said screw engaging the rear side of the bar; and braces secured to said plates extending downwardly and laterally therefrom and secured to the said axle.

Signed at Toronto this third day of October 1914, in the presence of the two undersigned witnesses.

THOMAS FINDLEY.
OTTO G. RIESKE.

Witnesses:
CHARLES McLEOD,
JOHN G. HOSSACK.

Copies of this patent may be obtained for five cents each, by addressing the "Commissioner of Patents, Washington, D. C."